US012576621B2

(12) United States Patent
Lee et al.

(10) Patent No.: US 12,576,621 B2
(45) Date of Patent: Mar. 17, 2026

(54) ADHESIVELESS THERMALLY LAMINATED BARRIER HEAT SEALING FILMS INCLUDING POLYETHYLENE

(71) Applicant: Dow Global Technologies LLC, Midland, MI (US)

(72) Inventors: Edward L. Lee, Singapore (SG); Hwee Tatz Thai, Singapore (SG); Wu Aik Yee, Singapore (SG); Hwee Lun Goh, Singapore (SG)

(73) Assignees: Dow Global Technologies LLC, Midland, MI (US); Performance Materials NA, Inc., Midland, MI (US)

( * ) Notice: Subject to any disclaimer, the term of this patent is extended or adjusted under 35 U.S.C. 154(b) by 44 days.

(21) Appl. No.: 17/995,345

(22) PCT Filed: Apr. 26, 2021

(86) PCT No.: PCT/US2021/029058
§ 371 (c)(1),
(2) Date: Oct. 3, 2022

(87) PCT Pub. No.: WO2021/247163
PCT Pub. Date: Dec. 9, 2021

(65) Prior Publication Data
US 2023/0142282 A1      May 11, 2023

Related U.S. Application Data

(60) Provisional application No. 63/035,024, filed on Jun. 5, 2020.

(51) Int. Cl.
B32B 27/08          (2006.01)
B32B 7/02           (2019.01)
(Continued)

(52) U.S. Cl.
CPC ................ B32B 27/08 (2013.01); B32B 7/02 (2013.01); B32B 7/12 (2013.01); B32B 27/18 (2013.01);
(Continued)

(58) Field of Classification Search
CPC .. B32B 27/08; B32B 7/02; B32B 7/12; B32B 27/18; B32B 27/306; B32B 27/308;
(Continued)

(56) References Cited

U.S. PATENT DOCUMENTS 5,284,540 A      2/1994  Roth et al.
6,333,061 B1    12/2001  Vadhar
(Continued)

FOREIGN PATENT DOCUMENTS

CA            2878104 A1      1/2014
CN          109228584 A      1/2019
(Continued)

OTHER PUBLICATIONS

PCT/US2021/029058, International Search Report and Written Opinion with a mailing date of Jul. 21, 2021.

*Primary Examiner* — Michael Zhang
(74) *Attorney, Agent, or Firm* — Jacob R. Graham

(57)          ABSTRACT

Provided are heat sealing, barrier laminates including polyethylene. The laminates can be adhesiveless and fully compatible with polyethylene recycling streams. They can exhibit improved, maintained, or desirable properties in comparison to existing laminate structures that are not fully compatible with polyethylene recycling streams. The laminate comprises a multilayer film and an oriented film. The oriented film is thermally laminated to the outer layer of the multilayer film to provide the laminate.

10 Claims, 2 Drawing Sheets

(51) Int. Cl.

| | |
|---|---|
| *B32B 7/12* | (2006.01) |
| *B32B 27/18* | (2006.01) |
| *B32B 27/30* | (2006.01) |
| *B32B 27/32* | (2006.01) |

(52) U.S. Cl.
CPC .......... *B32B 27/306* (2013.01); *B32B 27/308* (2013.01); *B32B 27/32* (2013.01); *B32B 2250/05* (2013.01); *B32B 2250/24* (2013.01); *B32B 2270/00* (2013.01); *B32B 2307/31* (2013.01); *B32B 2307/518* (2013.01); *B32B 2307/72* (2013.01); *B32B 2307/7244* (2013.01); *B32B 2307/7246* (2013.01); *B32B 2307/732* (2013.01); *B32B 2307/75* (2013.01); *B32B 2439/00* (2013.01)

(58) Field of Classification Search
CPC . B32B 27/32; B32B 2250/05; B32B 2250/24; B32B 2270/00; B32B 2307/31; B32B 2307/518; B32B 2307/72; B32B 2307/7244; B32B 2307/7246; B32B 2307/732; B32B 2307/75; B32B 2439/00; B32B 2307/516; B32B 2439/70
See application file for complete search history.

(56) References Cited

U.S. PATENT DOCUMENTS

| | | | |
|---|---|---|---|
| 9,676,172 | B2 | 6/2017 | Rosa et al. |
| 2009/0029081 | A1* | 1/2009 | Lee ...................... B32B 27/308 |
| | | | 428/483 |
| 2009/0104424 | A1* | 4/2009 | Manrique .............. B29C 48/08 |
| | | | 428/220 |
| 2014/0170399 | A1 | 6/2014 | Bhattacharya et al. |
| 2018/0079880 | A1 | 3/2018 | Miyake et al. |
| 2019/0001636 | A1* | 1/2019 | Kupsch .................. B32B 27/34 |
| 2019/0218354 | A1 | 7/2019 | Casarrubias et al. |
| 2020/0122439 | A1 | 4/2020 | Grefenstein et al. |

FOREIGN PATENT DOCUMENTS

| | | | | | |
|---|---|---|---|---|---|
| EP | | 2762308 | B1 | 9/2016 | |
| EP | | 3569411 | A1 | 11/2019 | |
| JP | | 2009039979 | A | 2/2009 | |
| JP | | 2020069788 | | 5/2020 | |
| WO | WO-2017053221 | A1 * | 3/2017 | ............ B32B 27/08 |
| WO | | 2018172510 | A1 | 9/2018 | |
| WO | | 2019222332 | | 11/2019 | |

* cited by examiner

ADHESIVELESS THERMALLY LAMINATED BARRIER HEAT SEALING FILMS INCLUDING POLYETHYLENE

TECHNICAL FIELD

Embodiments of the present disclosure generally relate to laminates, and more particularly relate to laminates including polyethylene.

INTRODUCTION

Laminates that incorporate polypropylene, polyamide, and polyethylene terephthalate contain multiple layers and are widely used in flexible packaging for consumer products. For example, a typical laminate for flexible packaging can include an outer printing substrate of a biaxially oriented polypropylene (BOPP), a barrier layer of metalized films, an adhesive layer of solvent-based adhesive, and a sealant layer of polyethylene. The combination of layers and materials can allow for heat-resistance for a wide sealing window, good printability, high barrier performance, and sealing without shrinkage. But such laminates can be difficult, if not impossible, to recycle together due to the different types of materials that are not recycle-compatible with each other. As demand for sustainable and recyclable materials continues to rise, there remains a strong need for laminates that can be recycled more easily and that exhibit comparable or improved performance properties to existing structures.

SUMMARY

Embodiments of the present disclosure meet the foregoing needs by providing laminates that are thermally bonded without a laminating adhesive and can be fully recycle-compatible in polyethylene recycling streams. The performance of the inventive laminates can be better or at least comparable to other laminates, such as laminates comprising BOPP, and for example, can allow for use of faster packaging speeds during manufacturing. In aspects, the recyclable laminates can exhibit improved or maintained properties, such as bond strength, oxygen transmission rate (OTR), water vapor transmission rate (WVTR), heat seal initiation temperatures (HSIT), heat seal strength, hot tack strength, hot tack initiation temperature, and/or shrinkage, when compared to existing laminates.

Disclosed herein is a laminate. In embodiments, the laminate comprises: (a) a multilayer film comprising: (1) an outer layer comprising at least one of an anhydride-modified ethylene acrylate copolymer, anhydride-modified polyethylene, anhydride-modified ethylene vinyl acetate, ethylene-vinyl acetate copolymer, polyethylene/vinyl acetate copolymer, polyethylene/acrylic acid ethylene copolymer, polyethylene/acrylate copolymer, or polyethylene elastomer/plastomer; (2) a barrier layer comprising an ethylene vinyl alcohol copolymer; (3) a sealant layer, wherein the sealant layer comprises at least 70 wt. % of a polymer having a highest peak melting temperature ($T_m$) of 108° C. or less; and (4) a tie layer between the barrier layer and the sealant layer; and (b) an oriented film thermally laminated to the outer layer of the multilayer film and comprising an ethylene-based polymer having a density from 0.900 to 0.970 g/cm$^3$.

These and other embodiments are described in more detail in the Detailed Description.

DETAILED DESCRIPTION

Figure 1:
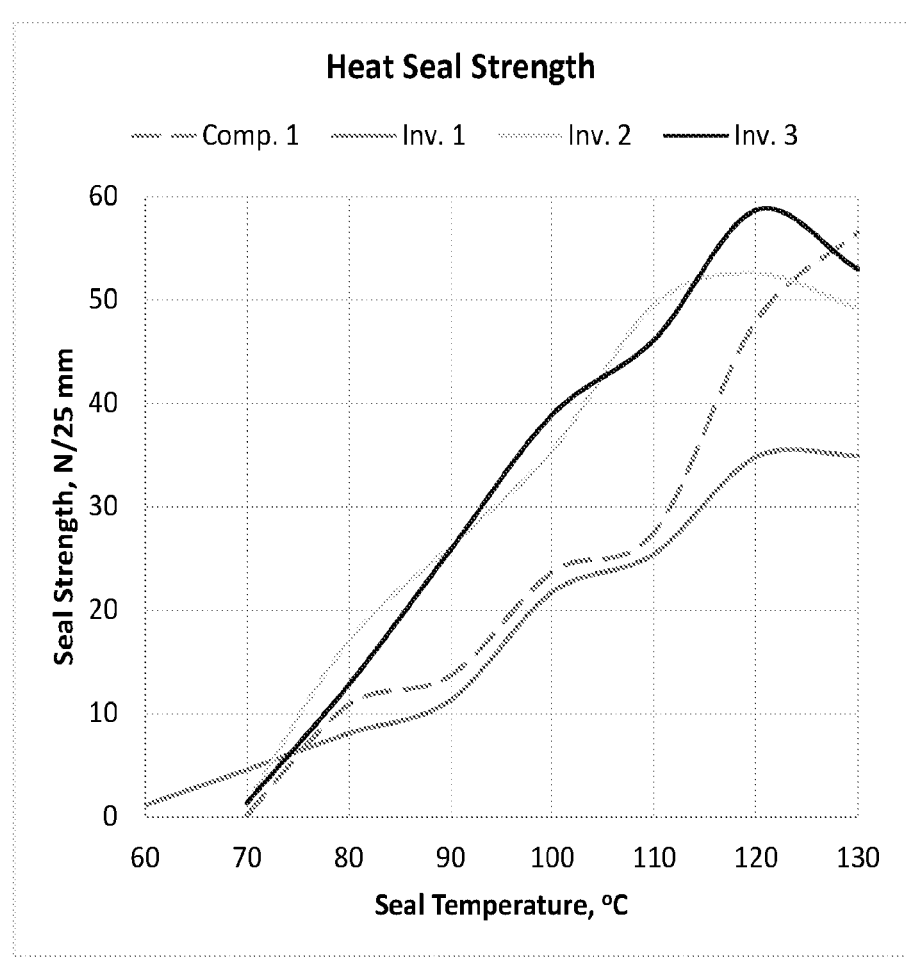
FIG. 1 is a heat seal strength graph of Comparative and Inventive Examples discussed below.

Aspects of the disclosed laminates are described in more detail below. The laminates can have a wide variety of applications, including, for example, pouches, stand-up pouches, pillow pouches, bulk bags, pre-made packages, sachets, or the like. This disclosure, however, should not be construed to limit the embodiments set forth below as this disclosure is an illustrative implementation of the embodiments described herein.

As used herein, the term "polymer" means a polymeric compound prepared by polymerizing monomers, whether of the same or a different type. The generic term polymer thus embraces the term homopolymer (employed to refer to polymers prepared from only one type of monomer), and the term copolymer or interpolymer. Trace amounts of impurities (for example, catalyst residues) may be incorporated into and/or within the polymer. A polymer may be a single polymer, a polymer blend, or a polymer mixture, including mixtures of polymers that are formed in situ during polymerization.

As used herein, the terms "polyethylene" or "ethylene-based polymer" shall mean polymers comprising a majority amount (>50 mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); ethylene-based plastomers (POP) and ethylene-based elastomers (POE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems and chromium-based catalyst systems as well as single-site catalysts, including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and includes linear, substantially linear or heterogeneous polyethylene copolymers or homopolymers. LLDPEs contain less long chain branching than LDPEs and include the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076, 698; and/or blends thereof (such as those disclosed in U.S. Pat. No. 3,914,342 or U.S. Pat. No. 5,854,045). LLDPEs can be made via gas-phase, solution-phase or slurry polymerization or any combination thereof, using any type of reactor or reactor configuration known in the art.

The term "MDPE" refers to polyethylenes having densities from 0.926 to 0.935 $g/cm^3$. "MDPE" is typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and typically have a molecular weight distribution ("MWD") greater than 2.5.

The term "HDPE" refers to polyethylenes having densities greater than about 0.935 $g/cm^3$ and up to about 0.980 $g/cm^3$, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 to 0.912 $g/cm^3$, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers.

As used herein, the term "polyethylene elastomer/plastomer" shall mean a substantially linear, or linear, ethylene/α-olefin copolymer containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Polyethylene elastomers/plastomers have a density from 0.865 $g/cm^3$, or 0.870 $g/cm^3$, or 0.880 $g/cm^3$, or 0.890 $g/cm^3$ to 0.900 $g/cm^3$, or 0.902 $g/cm^3$, or 0.904 $g/cm^3$, or 0.909 $g/cm^3$, or 0.910 $g/cm^3$. Nonlimiting examples of polyethylene elastomers/plastomers include AFFINITY™ plastomers and elastomers (available from The Dow Chemical Company), EXACT™ plastomers (available from ExxonMobil Chemical), Tafmer (available from Mitsui), Nexlene™ (available from SK Chemicals Co.), and Lucene™ (available LG Chem Ltd.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Multilayer Film of the Laminate

The laminate disclosed herein comprises a multilayer film. The multilayer film according to embodiments disclosed herein includes an outer layer, a barrier layer, a sealant layer, and a tie layer. In further embodiments, the multilayer film comprises a second tie layer in addition to an outer layer, a barrier layer, a sealant layer, and a tie layer.

Outer Layer of Multilayer Film

The multilayer film of the laminate comprises an outer layer.

In embodiments, the outer layer of the multilayer film is laminated to an oriented film as described below and can be positioned next or in close proximity to a barrier layer comprising an ethylene vinyl alcohol copolymer. In other embodiments, a second tie layer is placed between the outer layer and the barrier layer. In even further embodiments, additional layers can be placed between the outer layer and the barrier layer.

According to embodiments disclosed herein, the outer layer of the multilayer film comprises at least one of an anhydride-modified ethylene acrylate copolymer, anhydride-modified polyethylene, anhydride-modified ethylene vinyl acetate, polyethylene/acrylic acid ethylene copolymer, ethylene-vinyl acetate copolymer, polyethylene/vinyl acetate copolymer, polyethylene/acrylate copolymer, or polyethylene elastomer/plastomer.

In embodiments where the outer layer comprises an ethylene-vinyl acetate copolymer, the ethylene-vinyl acetate copolymer can have a density in the range of from 0.930 to 0.980 $g/cm^3$. All individual values and subranges of a density of from 0.930 to 0.980 $g/cm^3$ are disclosed and included herein; for example, the ethylene-vinyl acetate copolymer can have a density in the range of from 0.930 to 0.980 $g/cm^3$, 0.935 to 0.970 $g/cm^3$, 0.935 to 0.950 $g/cm^3$, 0.935 to 0.945 $g/cm^3$, or 0.940 to 0.945 $g/cm^3$.

In embodiments where the outer layer comprises an ethylene-vinyl acetate copolymer, the ethylene-vinyl acetate copolymer can have a melt index ($I_2$) of from 0.1 g/10 min to 500 g/10 min, or from 0.2 g/10 min to 400 g/10 min, or from 0.5 g/10 min to 100 g/10 min or from 0.1 to 30 g/10 min, or from 0.1 to 10 g/10 min.

In embodiments where the outer layer comprises an ethylene-vinyl acetate copolymer, the ethylene-vinyl acetate copolymer can have from 5 to 50 wt. % vinyl acetate content, based on the total weight of the ethylene vinyl acetate copolymer. All individual values and subranges of from 5 to 50 wt. % vinyl acetate content are disclosed and included herein. For example, in some embodiments, the ethylene-vinyl acetate copolymer can have from 5 to 10 wt. %, from 10 to 30 wt. %, or from 30 to 50 wt. % vinyl acetate content, based on total weight of the ethylene-vinyl acetate copolymer.

Examples of commercially available ethylene-vinyl acetate copolymers that can be used in some embodiments include ELVAX™ 470 (18% wt. % vinyl acetate content) available from The Dow Chemical Company, Midland, MI.

In embodiments where the outer layer comprises a polyethylene/acrylate copolymer, the polyethylene/acrylate copolymer can have a density in the range of from 0.925 to 0.955 $g/cm^3$. All individual values and subranges of a density of from 0.925 to 0.955 $g/cm^3$ are disclosed and included herein; for example, the polyethylene/acrylate copolymer can have a density in the range of from 0.925 to 0.955 $g/cm^3$, 0.925 to 0.945 $g/cm^3$, 0.930 to 0.955 $g/cm^3$, 0.930 to 0.945 $g/cm^3$, 0.935 to 0.955 $g/cm^3$, or 0.935 to 0.945 $g/cm^3$.

In embodiments where the outer layer comprises a polyethylene/acrylate copolymer, the polyethylene/acrylate copolymer can have a melt index ($I_2$) of from 0.1 g/10 min to 50 g/10 min, or from 0.5 g/10 min to 20 g/10 min, or from 1.0 g/10 min to 10 g/10 min.

Commercially available examples of polyethylene/acrylate copolymers that can be used in the outer layer include those commercially available from The Dow Chemical Company (Midland, MI) under the name BYNEL™, including, for example, BYNEL™ 22E780 Adhesive Resin and BYNEL™ 22E757 Adhesive Resin.

In embodiments where the outer layer comprises a polyethylene elastomer/plastomer, the polyethylene elastomer/plastomer can have a density in the range of from 0.865 to 0.910 g/cm³. All individual values and subranges of a density of from 0.865 to 0.910 g/cm³ are disclosed and included herein; for example, the polyethylene elastomer/plastomer can have a density in the range of from 0.865 to 0.910 g/cm³, 0.865 to 0.900 g/cm³, 0.865 to 0.890 g/cm³, 0.865 to 0.880 g/cm³, 0.870 to 0.910 g/cm³, 0.870 to 0.900 g/cm³, 0.870 to 0.890 g/cm³, 0.870 to 0.880 g/cm³, 0.880 to 0.910 g/cm³, 0.880 to 0.900 g/cm³, 0.880 to 0.890 g/cm³, 0.890 to 0.910 g/cm³, 0.890 to 0.900 g/cm³, or 0.900 to 0.910 g/cm³.

In embodiments where the outer layer comprises a polyethylene elastomer/plastomer, the polyethylene elastomer/plastomer can have a melt index ($I_2$) in the range of from 0.50 to 20 g/10 minutes (g/10 min). All individual values and subranges of a melt index of from 0.50 to 20 g/10 min are disclosed and include herein; for example, the polyethylene elastomer/plastomer can have a melt index of a lower limit of 0.50, 1.0, 2.0, 5.0, 10.0, 15, or 18 g/10 min to an upper limit of 1.0, 2.0, 5.0, 10.0, 15, 18, 19, or 20 g/10 min.

Commercially available examples of polyethylene plastomers/elastomers that can be used in the outer layer include those commercially available from The Dow Chemical Company (Midland, MI) under the name AFFINITY™, including, for example, AFFINITY™ VP 8770G1, AFFINITY™ PF7266, AFFINITY™ PL 1881G, and AFFINITY™ PF1140G.

In embodiments, the outer layer further comprises at least one of a linear low density polyethylene, low density polyethylene, medium density polyethylene, or high density polyethylene. In such embodiments, the outer layer can comprise up to 50 wt. % of at least one of a linear low density polyethylene, low density polyethylene, medium density polyethylene, or high density polyethylene.

Barrier Layer of Multilayer Film

The multilayer film of the laminate comprises a barrier layer.

In embodiments, the barrier layer of the multilayer film can be positioned next or in proximity to a tie layer described below and the outer layer described above. The barrier layer according to embodiments disclosed herein comprises an ethylene vinyl alcohol copolymer (EVOH).

In embodiments, the EVOH of the barrier layer has an ethylene content of from 20 to 50 mol %. All subranges and individual values of an ethylene content of from 20 to 50 mol % are disclosed and included herein. For example, in embodiments, the EVOH of the barrier layer has an ethylene content of from 20 to 50 mol %, or 22 to 45 mol %, or 25 to 40 mol %. A person of ordinary skill in the art will appreciate that the ethylene content of the EVOH can contribute to lower or higher OTR of the laminate disclosed herein (i.e., in general, the lower the ethylene content, the lower the achievable OTR value is). A person of ordinary skill in the art will also appreciate that a barrier layer comprising an EVOH with lower ethylene content may be suitable for flexible bottle and tube applications and a barrier layer comprising an EVOH with higher ethylene content may allow for easier processing, long-term run stability, and packaging types requiring flexibility (flex crack resistance), such as, thermoformability.

Commercially available examples of EVOH that can be used in the barrier layer include those commercially available from Kuraray Co., Ltd. (Tokyo, Japan) under the name EVAL™, including, for example, EVAL™ H171B (38 mol % ethylene content), and EVAL™ F171B (32 mol % ethylene content).

Various thicknesses are contemplated for the multilayer film. In embodiments, the barrier layer is 5 to 25% of the overall thickness of the multilayer film.

Sealant Layer of Multilayer Film

The multilayer film of the laminate comprises a sealant layer.

The sealant layer of the multilayer film comprises at least 70 wt. % of a polymer having a highest peak melting temperature ($T_m$) of 108° C. or less. The sealant layer can act as an inside surface of the laminate and, for example, can provide a way for sealing a package around a packaged product. The composition of the sealant layer can influence the ability of the laminate and sealant layer to obtain a high sealing bond strength at lower sealing temperatures. In embodiments, the sealant layer is at least 10 microns thick. In further embodiments, the sealant layer is 25 to 60% of overall thickness of the multilayer film.

The sealant layer of the multilayer film comprises at least 70 wt. % of a polymer, based on the total weight of the sealant layer. All individual values and subranges of at least 70 wt. % are disclosed and included herein. For example, in embodiments, the sealant layer can comprise at least 70 wt. %, at least 80 wt. %, at least 90 wt. %, at least 95 wt. %, at least 99 wt. %, at least 99.5 wt. %, or from 70 wt. % to 100 wt. %, 75 wt. % to 99 wt. %, 80 wt. % to 95 wt. %, or 90 to 95 wt. % of a polymer, based on the total weight of the sealant layer.

The sealant layer of the multilayer film comprises at least 70 wt. % of a polymer having a highest peak melting temperature ($T_m$) of 108° C. or less. All individual values and subranges of 108° C. or less are disclosed and included herein. For example, in embodiments, the polymer of the sealant layer has a highest peak melting temperature ($T_m$) of 108° C. or less, 106° C. or less, 104° C. or less, 102° C. or less, 100° C. or less, 98° C. or less, 96° C. or less, 94° C. or less, or 92° C. or less, or in the range of from 70° C. to 108° C., 70° C. to 100° C., 70° C. to 95° C., 75° C. to 108° C., 75° C. to 100° C., or 75° C. to 95° C., where highest peak melting temperature ($T_m$) can be measured in accordance with the DSC test method described below.

In embodiments, the polymer of the sealant layer comprises or consists of a polyethylene elastomer/plastomer that has a highest peak melting temperature ($T_m$) of 108° C. or less. In such embodiments, the polyethylene elastomer/plastomer of the sealant layer can have a density in the range of from 0.865 to 0.910 g/cm³. All individual values and subranges of a density of from 0.865 to 0.910 g/cm³ are disclosed and included herein; for example, the polyethylene elastomer/plastomer can have a density in the range of from 0.865 to 0.910 g/cm³, 0.865 to 0.900 g/cm³, 0.865 to 0.890 g/cm³, 0.865 to 0.880 g/cm³, 0.865 to 0.870 g/cm³, 0.870 to 0.910 g/cm³, 0.870 to 0.900 g/cm³, 0.870 to 0.890 g/cm³, 0.870 to 0.880 g/cm³, 0.880 to 0.910 g/cm³, 0.880 to 0.900

$g/cm^3$, 0.880 to 0.890 $g/cm^3$, 0.890 to 0.910 $g/cm^3$, 0.890 to 0.900 $g/cm^3$, or 0.900 to 0.910 $g/cm^3$.

In embodiments where the polymer of the sealant layer comprises or consists of a polyethylene elastomer/plasto-mer, the polyethylene elastomer/plastomer can have a melt index ($I_2$) in the range of from 0.50 to 20 g/10 minutes (g/10 min). All individual values and subranges of a melt index of from 0.50 to 20 g/10 min are disclosed and include herein; for example, the polyethylene elastomer/plastomer can have a melt index of a lower limit of 0.50, 1.0, 2.0, 5.0, 10.0, 15, or 18 g/10 min to an upper limit of 1.0, 2.0, 5.0, 10.0, 15, 18, 19, or 20 g/10 min.

Commercially available examples of polyethylene elas-tomers/plastomers that can be used in the sealant layer include those commercially available from The Dow Chemi-cal Company (Midland, MI) under the name AFFINITY™, including, for example, AFFINITY™ VP 8770G1, AFFIN-ITY™ PF7266, AFFINITY™ PL 1881G and AFFINITY™ PF1140G.

In embodiments, the polymer of the sealant layer com-prises or consists of an ionomer of ethylene (meth)acrylic acid copolymer (referred herein also as an "ionomer of ethylene acid copolymer") that has a highest peak melting temperature ($T_m$) of 108° C. or less. The cation source of the ionomer of ethylene acid copolymer may be a mono- or divalent cation source, including formates, acetates, hydrox-ides, nitrates, carbonates, and bicarbonates. In embodiments, the ionomer of ethylene acid copolymer may have been treated with one or more cations or cation sources which may comprises magnesium, sodium, zinc, or combinations thereof.

In embodiments, the ethylene content of the ionomer of ethylene acid copolymer is greater than 50 wt. %, or greater than 60 wt. %, based on the total weight of the ionomer of ethylene acid copolymer. For example, the ethylene content of the ionomer of ethylene acid copolymer can be from 50 wt. % to 95 wt. %, from 50 wt. % to 90 wt. %, from 50 wt. % to 85 wt. %, or from 60 wt. % to 80 wt. %, based on total weight of the ionomer of ethylene acid copolymer.

In embodiments, the ionomer of ethylene acid copolymer has a melt index ($I_2$) of from 0.1 g/10 min to 16 g/10 min, from 0.5 g/10 min to 15 g/10 min, from 3 g/10 min to 13 g/10 min, from 3.5 g/10 min to 10 g/10 min, or from 5 g/10 min to 8 g/10 min Commercially available ionomers of ethylene acid copolymer include those available under the name SURLYN™ from The Dow Chemical Company (Mid-land, MI).

In embodiments, the polymer of the sealant layer com-prises or consists of a polyethylene that has a highest peak melting temperature ($T_m$) of 108° C. or less. For example, in embodiments, the polymer of the sealant layer can comprise or consists of a linear low density polyethylene (LLDPE). The linear low density polyethylene can have a density less than or equal to 0.930 $g/cm^3$. All individual values and subranges less than or equal to 0.930 $g/cm^3$ are included and disclosed herein; for example, the density of the linear low density polyethylene can be from a lower limit of 0.870 $g/cm^3$ to an upper limit of 0.928, 0.925, 0.920 or 0.915 $g/cm^3$. All individual values and subranges between 0.870 and 0.930 $g/cm^3$ are included and disclosed herein.

Commercially available examples of polyethylenes that can be used in the sealant layer include those commercially available from The Dow Chemical Company under the name ELITE™ AT including, for example, ELITE™ AT 6202 and ELITE™ AT 6410.

In addition to the at least 70 wt. % of a polymer having a highest peak melting temperature ($T_m$) of 108° C. or less, the sealant layer, in embodiments, can further comprise at least one additional polymer and/or at least one additive. For example, the at least one additional polymer can be selected from the group of a polyethylene, ethylene vinyl acetate, ethylene acrylic acid, or combinations thereof in an amount of less than 30 wt. % of the seleant layer. And for example, the at least one additive can be selected from the group of antioxidants, ultraviolet light stabilizers, thermal stabilizers, slip agents, antiblock agent, antistatic agents, pigments or colorants, processing aids, crosslinking catalysts, flame retardants, fillers, foaming agents, or combinations thereof in an amount of less than 30 wt. % of the seleant layer.

Tie Layer of Multilayer Film

The multilayer film comprises a tie layer between the barrier layer and the sealant layer. The tie layer can adhere the barrier layer to the sealant layer.

In embodiments, the tie layer comprises an adhesive resin selected from the group consisting of anhydride grafted ethylene-based polymer, ethylene acid copolymer, and eth-ylene vinyl acetate. Examples of anhydride grafting moieties may include but are not limited to, maleic anhydride, citraconic anhydride, 2-methyl maleic anhydride, 2-chloro-maleic anhydride, 2,3-dimethylmaleic anhydride, bicyclo[2, 2,1]-5-heptene-2,3-dicarboxylic anhydride and 4-methyl-4-cyclohexene-1,2-dicarboxylic anhydride, bicyclo(2.2.2)oct-5-ene-2,3-dicarboxylic acid anhydride, lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, tetrahydrophtalic anhydride, norbom-5-ene-2,3-dicarboxylic acid anhydride, nadic anhydride, methyl nadic anhydride, himic anhydride, methyl himic anhydride, and x-methyl-bi-cyclo(2.2.1)hept-5-ene-2,3-dicarboxylic acid anhydride. In one embodiment, the anhydride grafting moiety comprises maleic anhydride.

In embodiments, the tie layer comprises an anhydride-modified, linear low density polyethylene. In embodiments, the anhydride-modified, linear low density polyethylene has a density in the range of from 0.860 $g/cm^3$ to 0.935 $g/cm^3$. All individual values and subranges of from 0.860 $g/cm^3$ to 0.935 $g/cm^3$ are disclosed and included herein; for example, the anhydride-modified, linear low density polyethylene can have a density in the range of from 0.875 $g/cm^3$ to 0.935 $g/cm^3$, 0.900 $g/cm^3$ to 0.925 $g/cm^3$, 0.910 $g/cm^3$ to 0.935 $g/cm^3$, 0.910 $g/cm^3$ to 0.925 $g/cm^3$, 0.915 $g/cm^3$ to 0.935 $g/cm^3$, or 0.920 $g/cm^3$ to 0.930 $g/cm^3$. In embodiments, the anhydride-modified, linear low density polyethylene has a melt index ($I_2$) from 0.1 g/10 min to 50 g/10 min, or from 0.5 g/10 min to 20 g/10 min, or from 1.0 g/10 min to 10 g/10 min.

In embodiments, the tie layer comprises from 0 to 100 wt. % of the anhydride-modified, linear low density polyethyl-ene, based on the total weight of the tie layer. All individual values and subranges of from 0 to 100 wt. % are disclosed and included herein. For example, in embodiments, the tie layer can comprise from 10 to 90 wt. %, 20 to 80 wt. %, 30 to 70 wt. %, or 40 to 60 wt. % of the anhydride-modified, linear low density polyethylene, based on the total weight of the tie layer.

Examples of commercially available anhydride-modified, linear low density polyethylenes that can be used in embodi-ments include BYNEL™ Series 4100 resins, such as BYNEL™ 41E710 and BYNEL™ 41E687, available from The Dow Chemical Company (Midland, MI).

In embodiments, the tie layer further comprises at least one of a linear low density polyethylene, low density polyethylene, medium density polyethylene, or high density polyethylene. For example, in embodiments, the tie layer further comprises a high density polyethylene having a density in the range of from 0.945 g/cm³ to 0.970 g/cm³. All individual values and subranges of from 0.945 g/cm³ to 0.970 g/cm³ are disclosed and included herein; for example, the high density polyethylene can have a density in the range of from 0.945 g/cm³ to 0.965 g/cm³, 0.950 g/cm³ to 0.970 g/cm³, 0.950 g/cm³ to 0.965 g/cm³, 0.955 g/cm³ to 0.970 g/cm³, 0.955 g/cm³ to 0.965 g/cm³, or 0.955 g/cm³ to 0.965 g/cm³.

In embodiments where a high density polyethylene is present, the high density polyethylene of the tie layer can be a copolymer of ethylene and $C_3$-$C_{12}$ comonomer. In embodiments, the tie layer further comprises from 0 to 90 wt. % of a high density polyethylene, based on the total weight of the tie layer. All individual values and subranges of from 0 to 90 wt. % are disclosed and included herein. For example, in embodiments, the tie layer can comprise from 10 to 90 wt. %, 20 to 80 wt. %, 30 to 70 wt. %, or 40 to 60 wt. % of a high density polyethylene, based on the total weight of the tie layer. In embodiments, the melt index ($I_2$) of the high density polyethylene can be from 0.3 to 10.0 g/10 min, from 0.3 to 7.0 g/10 min, from 0.3 to 5.0 g/10 min, from 0.3 to 4.0 g/10 min, from 0.3 to 3.0 g/10 min, from 0.3 to 2.0 g/10 min or from 0.3 to 1.5 g/10 min, or from 0.5 to 1.0 g/10 min.

Commercially available examples of a high density polyethylene that can be used in the tie layer include those commercially available from The Dow Chemical Company (Midland, MI) under the name ELITE™ 5960G1 and DOWLEX™ 2006 G.

Second Tie Layer of the Multilayer Film

In embodiments, the multilayer film further comprises a second tie layer between the outer layer and the barrier layer. The second tie layer can adhere the outer layer to the barrier layer.

In embodiments, the second tie layer comprises an adhesive resin selected from the group consisting of anhydride grafted ethylene-based polymer, ethylene acid copolymer, and ethylene vinyl acetate. Examples of anhydride grafting moieties may include but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, bicyclo(2.2.2)oct-5-ene-2,3-dicarboxylic acid anhydride, lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, tetrahydrophtalic anhydride, norbom-5-ene-2,3-dicarboxylic acid anhydride, nadic anhydride, methyl nadic anhydride, himic anhydride, methyl himic anhydride, and x-methyl-bi-cyclo(2.2.1)hept-5-ene-2,3-dicarboxylic acid anhydride. In one embodiment, the anhydride grafting moiety comprises maleic anhydride.

In embodiments, the second tie layer comprises an anhydride-modified, linear low density polyethylene. In embodiments, the anhydride-modified, linear low density polyethylene has a density in the range of from 0.860 g/cm³ to 0.935 g/cm³. All individual values and subranges of from 0.860 g/cm³ to 0.935 g/cm³ are disclosed and included herein; for example, the anhydride-modified, linear low density polyethylene can have a density in the range of from 0.875 g/cm³ to 0.935 g/cm³, 0.900 g/cm³ to 0.925 g/cm³, 0.910 g/cm³ to 0.935 g/cm³, 0.910 g/cm³ to 0.925 g/cm³, 0.915 g/cm³ to 0.935 g/cm³, or 0.920 g/cm³ to 0.930 g/cm³. In embodiments, the anhydride-modified, linear low density polyethylene has a melt index (I2) from 0.1 g/10 min to 50 g/10 min, or from 0.5 g/10 min to 20 g/10 min, or from 1.0 g/10 min to 10 g/10 min.

In embodiments, the second tie layer comprises from 0 to 100 wt. % of the anhydride-modified, linear low density polyethylene, based on the total weight of the second tie layer. All individual values and subranges of from 0 to 100 wt. % are disclosed and included herein. For example, in embodiments, the second tie layer can comprise from 10 to 90 wt. %, 20 to 80 wt. %, 30 to 70 wt. %, or 40 to 60 wt. % of the anhydride-modified, linear low density polyethylene, based on the total weight of the second tie layer.

Examples of commercially available anhydride-modified, linear low density polyethylenes that can be used in embodiments include BYNEL™ Series 4100 resins, such as BYNEL™ 41E710 and BYNEL™ 41E687, available from The Dow Chemical Company (Midland, MI).

In embodiments, the second tie layer further comprises at least one of a linear low density polyethylene, low density polyethylene, medium density polyethylene, or high density polyethylene. For example, in embodiments, the second tie layer further comprises a high density polyethylene having a density in the range of from 0.945 g/cm³ to 0.970 g/cm³. All individual values and subranges of from 0.945 g/cm³ to 0.970 g/cm³ are disclosed and included herein; for example, the high density polyethylene of the second tie layer can have a density in the range of from 0.945 g/cm³ to 0.965 g/cm³, 0.950 g/cm³ to 0.970 g/cm³, 0.950 g/cm³ to 0.965 g/cm³, 0.955 g/cm³ to 0.970 g/cm³, 0.955 g/cm³ to 0.965 g/cm³, or 0.955 g/cm³

In embodiments where a high density polyethylene is present, the high density polyethylene of the second tie layer can be a copolymer of ethylene and $C_3$-$C_{12}$ comonomer. In embodiments, the second tie layer comprises from 0 to 90 wt. % of a high density polyethylene, based on the total weight of the second tie layer. All individual values and subranges of from 0 to 90 wt. % are disclosed and included herein. For example, in embodiments, the second tie layer can comprise from 10 to 90 wt. %, 20 to 80 wt. %, 30 to 70 wt. %, or 40 to 60 wt. % of a high density polyethylene, based on the total weight of the second tie layer. In embodiments, the high density polyethylene of the second tie layer can have a melt index ($I_2$) from 0.3 to 10.0 g/10 min, from 0.3 to 7.0 g/10 min, from 0.3 to 5.0 g/10 min, from 0.3 to 4.0 g/10 min, from 0.3 to 3.0 g/10 min, from 0.3 to 2.0 g/10 min or from 0.3 to 1.5 g/10 min, or from 0.5 to 1.0 g/10 min.

Commercially available examples of a high density polyethylene that can be used in the second tie layer include those commercially available from The Dow Chemical Company (Midland, MI) under the name ELITE™ 5960G1 and DOWLEX™ 2006 G.

Oriented Film of the Laminate

The laminate disclosed herein comprises an oriented film. The oriented film according to embodiments disclosed herein is thermally laminated to the outer layer of the multilayer film and comprises an ethylene-based polymer having a density from 0.900 to 0.970 g/cm³.

In embodiments, the ethylene-based polymer of the oriented film has a density from 0.900 to 0.970 g/cm³. All individual values and subranges of from 0.900 to 0.970 g/cm³ are disclosed and included herein. For example, the ethylene-based polymer can have a density of from 0.900 to 0.970 g/cm$^3$, 0.910 to 0.957 g/cm$^3$, 0.920 to 0.947 g/cm$^3$, 0.920 to 0.937 g/cm$^3$, 0.920 to 0.930 g/cm$^3$, or 0.920 to 0.927 g/cm$^3$.

In embodiments, the ethylene-based polymer has a melt index (I$_2$) of from 0.1 g/10 min to 10 g/10 min, or from 0.5 g/10 min to 8 g/10 min, or from 0.5 g/10 min to 5 g/10 min.

In embodiments, the ethylene-based polymer comprises at least 50 wt. % of the oriented film, based on the total weight of the oriented film. All individual values and subranges of at least 50 wt. % are disclosed and included herein. For example, the ethylene-based polymer can comprise at least 50 wt. %, at least 75 wt. %, at least 90 wt. %, at least 99 wt. %, or at least 99.9 wt. % of the oriented film, based on the total weight of the oriented film.

In addition to the ethylene-based polymer, the oriented film, in embodiments, can further comprise at least one additional polymer, and the at least one additional polymer can be selected from the group of ultra low density polyethylene, low density polyethylene, polyethylene elastomer/plastomer, ethylene vinyl alcohol copolymer (EVOH), ethylene vinyl acetate, ethylene acrylic acid, or combinations thereof in an amount of less than 50 wt. % of the oriented film.

In embodiments, the oriented film is a machine direction oriented film. In such embodiments, the oriented films can be a machine direction oriented (MDO) polyethylene film. In other embodiments, the oriented films is biaxially oriented. In such embodiments, the oriented film can be a biaxially oriented polyethylene (BOPE) film. In embodiments in which the oriented film is a BOPE, the BOPE may be biaxially oriented using a tenter frame sequential biaxial orientation process, and may be referred to as tenter frame biaxially oriented polyethylene (TF-BOPE). Such techniques are generally known to those of skill in the art. In other embodiments, the oriented film can be biaxially oriented using other techniques known to those of skill in the art based on the teachings herein, such as a double bubble orientation process. In general, with a tenter frame sequential biaxial orientation process, the tenter frame is incorporated as part of an extrusion line. After extruding from a flat die, the film is cooled down on a chill roll, and is immersed into a water bath filled with room temperature water. The cast film is then passed onto a series of rollers with different revolving speeds to achieve stretching in the machine direction. There are several pairs of rollers in the MD stretching segment of the fabrication line, and are all oil heated. The paired rollers work sequentially as pre-heated rollers, stretching rollers, and rollers for relaxing and annealing. The temperature of each pair of rollers is separately controlled. After stretching in the machine direction, the film web is passed into a tenter frame hot air oven with heating zones to carry out stretching in the cross direction. The first several zones are for pre-heating, followed by zones for stretching, and then the last zones for annealing.

The oriented film can be a multilayer film or a monolayer film. For example, in embodiments, the oriented film can be a monolayer TF-BOPE film comprising an ethylene-based polymer. In other embodiments, the oriented film is a multilayer film and comprises at least two layers. For example, in embodiments, the oriented film can be a multilayer TF-BOPE film comprising three layers (e.g. an A/B/C structure, TF-BOPE film made by co-extruding three layers using a single ethylene-based polymer resin). Embodiments of the oriented film can include ties layer, sealant layers, or barrier layers, for example. In embodiments, the oriented film comprises a barrier layer comprising an ethylene vinyl alcohol copolymer.

In embodiments, the oriented film has a cross directional draw ratio larger than its machine direction draw ratio, and the oriented film has a ratio of percent elongation at break in the machine direction to percent elongation at break in the cross direction of at least 2 to 1. In embodiments, the oriented film can exhibit a percent elongation at break in the machine direction that is at least 2 times greater than the percent elongation at break in the cross direction when measured according to ASTM D882, or in the alternative, at least 5 times greater, or in the alternative, at least 8 times greater, or in the alternative, at least 10 times greater.

In embodiments, the oriented film is oriented in the machine direction and/or the cross direction. In embodiments, the oriented film can be oriented in the machine direction at a draw ratio of 2:1 to 6:1, or in the alternative, at a draw ratio of 3:1 to 5:1. The oriented film, in embodiments, can be oriented in the cross direction at a draw ratio of 2:1 to 9:1, or in the alternative, at a draw ratio of 3:1 to 8:1.

In embodiments, depending for example on the end use application, the oriented film can be corona treated or printed using techniques known to those of skill in the art before or after lamination to the multilayer film.

The multilayer film and the oriented film disclosed herein can have a variety of thicknesses depending, for example, on the number of layers. For example, in embodiments, the multilayer film or the oriented film can have a thickness of from 10 to 200 microns, or alternatively, of from 15 to 100 microns.

Additives

It should be understood that any of the foregoing layers of the multilayer film or oriented film can further comprise one or more additives as known to those of skill in the art such as, for example, antioxidants, ultraviolet light stabilizers, thermal stabilizers, slip agents, antiblock agents, antistatic agents, pigments or colorants, processing aids, crosslinking catalysts, flame retardants, fillers and foaming agents. For example, in embodiments, the sealant layer of the multilayer film comprises at least one of a slip agent or antiblock agent.

The Laminate

As noted above, the oriented film is thermally laminated to the outer layer of the multilayer film, and the combination of the multilayer film and oriented film provides the laminate.

The laminate of the present invention can have several desirable properties. For example, the laminate of the present invention can have one or more of the following properties: a bond strength of at least 2.00 N/25 mm; an OTR of less than 5.25 cm$^3$/day/m$^2$; a WVTR of less than 5.75 g/day/m$^2$; a heat seal initiation temperature at 5N of less than 115° C.; a seal strength at 120° C. of at least 4.0 N/25 mm; a hot tack initiation at 1N of less than 95° C.; a hot tack strength at 110° C. of at least 1.20 N; and zero percent (0%) shrinkage at temperatures in the range of from 70° C. to 110° C.

In embodiments, the laminate of the present invention can exhibit a bond strength of at least at least 2.00 N/25 mm, or alternatively at least 3.50 N/25 mm, or alternatively at least 5.00 N/25 mm, or alternatively of at least 5.50 N/25 mm, or alternatively of at least 6.50 N/25 mm, or alternatively of at least 7.00 N/25 mm, or alternatively of at least 7.50 N/25 mm, where bond strength can be measured in accordance with the test method described below.

In embodiments, the laminate of the present invention can exhibit an OTR of less than 5.25 $cm^3/day/m^2$, or alternatively less than 4.00 $cm^3/day/m^2$, or alternatively less than 3.00 $cm^3/day/m^2$, or alternatively less than 2.50 $cm^3/day/m^2$, where OTR can be measured in accordance with the test method described below.

In embodiments, the laminate of the present invention can exhibit a WVTR of less than 5.75 $g/day/m^2$, or alternatively less than 5.00 $g/day/m^2$, or alternatively less than 4.75 $g/day/m^2$, where WVTR can be measured in accordance with the test method described below.

In embodiments, the laminate of the present invention can exhibit a heat seal initiation temperature at 5N of less than 115° C., or alternatively less than 110° C., or alternatively less than 105° C., or alternatively less than 95° C., or alternatively less than 85° C., or alternatively less than 75° C., where heat seal initiation at 5N can be measured in accordance with the test method described below.

In embodiments, the laminate of the present invention can exhibit a seal strength at 120° C. of at least 4.0 N/25 mm, or alternatively at least 10.0 N/25 mm, or alternatively at least 30.0 N/25 mm, or alternatively at least 50.0 N/25 mm, or alternatively at least 55.0 N/25 mm, where seal strength at 120° C. can be measured in accordance with the test method described below.

In embodiments, the laminate of the present invention can exhibit a hot tack initiation at 1 Newton of less than 95° C., or alternatively less than 80° C., or alternatively less than 78° C., or alternatively less than 76° C., or alternatively less than 72° C., where hot tack initiation at 1 Newton can be measured in accordance with the test method described below.

In embodiments, the laminate of the present invention can exhibit a hot tack strength at 110° C. of at least 1.20 N, or alternatively of at least 1.60 N, or alternatively of at least 1.80 N, or alternatively of at least 4.00 N, or alternatively of at least 5.00 N, where hot tack strength can be measured in accordance with the test method described below.

In embodiments, the laminate of the present invention can exhibit zero percent (0%) shrinkage at 70° C., 80° C., 90° C., 100° C., and 110° C., where shrinkage is measured in accordance with the test method described below, and can provide a sealing window of from 45° C. or less, or alternatively 40° C. or less, or alternatively 35° C. or less.

In embodiments, the laminate of the present invention comprises at least 90 wt. % polyethylene, or at least 95 wt. % polyethylene, or at least 99 wt. % polyethylene, or at least 99.5 wt. % polyethylene, or at least 99.9 wt. % polyethylene, based on the overall weight of the laminate.

In embodiments, the laminate of the present invention is free of an adhesive (e.g., a solvent-based or waterborne adhesive).

Articles

Embodiments of the present invention also provide articles formed from the laminate described herein. Examples of such articles can include packages, flexible packages, pouches, and sachets. In embodiments, packages of the present invention can comprise a liquid, a powder, a food product, or other items. Articles and packages of the present invention can be formed from the laminate disclosed herein using techniques known to those of skill in the art in view of the teachings herein.

Test Methods

Density

Density is measured in accordance with ASTM D792, and expressed in grams/cm$^3$ (g/cm$^3$).

Melt Index ($I_2$)

Melt index ($I_2$) is measured in accordance with ASTM D-1238 at 190° C. at 2.16 kg. The values are reported in g/10 min, which corresponds to grams eluted per 10 minutes.

Oxygen Transmission Rate (OTR)

Oxygen transmission rate (OTR) is measured in accordance with ASTM D3985 using a Mocon Ox-Tran 2/21. Samples are tested at 23° C., 100% 02 gas dry, 0% RH, 50 cm$^2$ sample size. The values are reported in $cm^3/day/m^2$.

Water Vapor Transmission Rate (WVTR)

Water Vapor Transmission Rate (WVTR) is measured in accordance with ASTM F1249 using Mocon Permatran-W 3/34 & 3/60. Samples are tested at 37.8° C., 100% RH, 50 cm$^2$ sample size. The values are reported in $g/day/m^2$.

Hot Tack Initiation and Hot Tack Strength

A hot tack test is performed using a J&B hot tack tester 4000 at sealing width of 25 mm, dwell seal time of 0.5 s, sealing pressure of 0.275 $N/mm^2$ (40 psi), and hot tack pull speed of 200 mm/s. Hot tack initiation is reported as the minimum temperature in degrees Celsius to reach 1 Newton force. Hot tack strength is measured in unit of Newton per 25 mm (N/25 mm).

Heat Seal Initiation Temperature and Seal Strength

To determine heat seal initiation temperature (HSIT) and seal strength, samples are sealed by a J&B Hot Tack 4000 Tester. The sample width is 25 mm, the dwell seal time is 0.5 seconds, and the seal pressure is 0.275 $N/mm^2$. Heat sealed samples are conditioned for 24 hours and then measured using a Zwick tensile machine, equipped with a 200 N load cell, and at a pulling speed of 500 mm/min HSIT is reported as a minimum temperature in degrees Celsius to reach 5 Newton force. Seal Strength values are reported in N/25 mm

Shrinkage

Shrinkage (%) is obtained by measuring the length and width of the seal area in both machine direction (MD) and cross or transverse direction (TD) after heat sealing the films together and calculating the percentage of change compared to the seal bar width, which can be between 1 mm to 15 mm Standard heat sealing machines, including PULSA impulse sealer or J&B Hot Tack tester, can be used, provided the machines have an accurate and adjustable temperature controller. Sealing conditions include jaw pressure (40-80 psi or 0.275-0.552 $N/mm^2$), dwell time (0.1-1.5 seconds), and seal temperature (60-150° C.) window and depend on packaging speed, where typical conditions for fast speed packaging machines are 40 psi (0.275 $N/mm^2$) jaw pressure and 0.5 seconds dwell time.

Bond Strength

Bond strength is measured using a Zwick tensile tester at a pulling speed of 250 mm/min and with 25 mm width strips.

The tensile tester is equipped with a gripper fixture (sample held in a T-shape) to hold two ends of a partially delaminated or partially peeled sample before being pulled apart. The upper gripper that is connected to the crosshead is driven in the tensile direction to measure the force required or bond strength between two adjacent layers of the multilayer sample. Maximum force and average force results are calculated from 5 measurements and recorded in Newtons (N/25 mm strips) units.

Highest Peak Melting Temperature ($T_m$)

Differential Scanning Calorimetry (DSC) is used to measure the melting and crystallization behavior of a polymer over a wide range of temperatures. For example, the TA Instruments Q1000 DSC, equipped with an RCS (refrigerated cooling system) and an autosampler is used to perform this analysis. The instrument is first calibrated using the software calibration wizard. A baseline is obtained by heating a cell from −80° C. to 280° C. without any sample in an aluminum DSC pan. Sapphire standards are then used as instructed by the calibration wizard. Next, 1 to 2 milligrams (mg) of a fresh indium sample are analyzed by heating the standards sample to 180° C., cooling to 120° C. at a cooling rate of 10° C./minute, and then keeping the standards sample isothermally at 120° C. for 1 minute. The standards sample is then heated from 120° C. to 180° C. at a heating rate of 10° C./minute. Then, it is determined that indium standards sample has heat of fusion ($H_f$)=28.71±0.50 Joules per gram (J/g) and onset of melting=156.6° C.±0.5° C. Test samples are then analyzed on the DSC instrument.

During testing, a nitrogen purge gas flow of 50 ml/min is used. Each sample is melt pressed into a thin film at about 175° C.; the melted sample is then air-cooled to room temperature (approx. 25° C.). The film sample is formed by pressing a "0.1 to 0.2 gram" sample at 175° C. at 1,500 psi, and 30 seconds, to form a "0.1 to 0.2 mil thick" film. A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C., and held isothermal for five minutes, in order to remove its thermal history. Next, the sample is cooled to −40° C., at a 10° C./minute cooling rate, and held isothermal at −40° C. for five minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are highest peak melting temperature ($T_m$), highest peak crystallization temperature (TO, onset crystallization temperature ($T_c$ onset), heat of fusion ($H_f$) (in Joules per gram), and the calculated % crystallinity for polyethylene samples using: % Crystallinity for PE=(($Hf$/(292 J/g))×100, and the calculated % crystallinity for polypropylene samples using: % Crystallinity for PP=(($Hf$)/165 J/g))×100. The heat of fusion ($H_f$) and the highest peak melting temperature are reported from the second heat curve. Highest peak crystallization temperature and onset crystallization temperature are determined from the cooling curve.

EXAMPLES

The following examples illustrate features of the present disclosure but are not intended to limit the scope of the disclosure.

Polymers/Film Used

The following materials were included in the example laminates discussed below.

ELITE™ 5960G1, an enhanced polyethylene resin having a density of 0.962 g/cm³ and melt index ($I_2$) of 0.85 g/10 min and commercially available from The Dow Chemical Company (Midland, MI).

DOW™ LDPE 450E, a low density polyethylene resin having a density of 0.923 g/cm³ and melt index ($I_2$) of 2.0 g/10 min and commercially available from The Dow Chemical Company (Midland, MI).

BYNEL™ 22E780, a polyethylene/acrylate copolymer resin having a density of 0.94 g/cm³ and melt index ($I_2$) of 2 g/10 min and commercially available from The Dow Chemical Company (Midland, MI).

ELVAX™ 470, an ethylene-vinyl acetate copolymer having 18 wt. % vinyl acetate comonomer content, a density of 0.941 g/cm³ and melt index ($I_2$) of 0.7 g/10 min, and commercially available from The Dow Chemical Company (Midland, MI).

BYNEL™ 41E710, an anhydride-modified, linear low density polyethylene resin having a density of 0.922 g/cm³ and melt index ($I_2$) of 2.7 g/10 min, and commercially available from The Dow Chemical Company (Midland, MI).

EVAL™ H171B, a 38 mol % ethylene vinyl alcohol copolymer having a density of 1.17 g/cm³ and melt index ($I_2$) of 1.7 g/10 min, and commercially available from Kuraray Co., Ltd. (Tokyo, Japan).

SURLYN™ 1707, an ionomer of ethylene acid copolymer neutralized with a sodium cation source, having a highest peak melting temperature ($T_m$) of 92° C., a density of 0.95 g/cm³ and melt index ($I_2$) of 0.9 g/10 min, and commercially available from The Dow Chemical Company (Midland, MI).

AFFINITY™ PF7266, a polyethylene elastomer/plastomer having a highest peak melting temperature ($T_m$) of 76° C., a density of 0.885 g/cm³ and melt index ($I_2$) of 2.5 g/10 min, and commercially available from The Dow Chemical Company (Midland, MI).

ADCOTE™ 545S/Co-reactant F, a solvent based 2-component polyurethane adhesive commercially available from The Dow Chemical Company (Midland, MI).

POLYBATCH® CE505, a slip masterbatch commercially available from Lyondell Basell (Houston, TX).

POLYBATCH® ABS, an antiblock masterbatch commercially available from Lyondell Basell (Houston, TX).

CONPOL™ 13B, an antiblock masterbatch commercially available from The Dow Chemical Company (Midland, MI).

CONPOL™ 20 S1, a slip masterbatch commercially available from The Dow Chemical Company (Midland, MI).

TF-BOPE Film, a linear low density polyethylene, biaxially oriented film stretched by tenter frame in the machine direction at a draw ratio of 3-5X and in the cross direction at a draw ratio of 7-9X to a thickness of 20 microns. The linear low density polyethylene has a density of 0.926 g/cm³ and melt index ($I_2$) of 1.7 g/10 min, and is commercially available from The Dow Chemical Company, Midland, MI, under the name INNATE™ XUS 59910.08.

BOPP Film, a printed biaxially oriented propylene film treated at 36 dynes and having an 18 micron gauge.

Laminates, designated as Inventive Examples 1-5 and Comparative Examples 1-2, are formed in a construction of PRINT-A-B-C-B-D, where "PRINT" corresponds to TF-BOPE Film for Inventive Examples and BOPP Film for Comparative Examples (an oriented film) and "A-B-C-B-D" corresponds to a five layer multilayer co-extruded film (a multilayer film). For each of the Inventive Examples, the TF-BOPE Film is thermally laminated to the five layer multilayer film using hot roll lamination process on ChemInstruments #007416 at a temperature of 160° C., pressure of 60 psi, and speed of 0.75 m/min. Examples are conditioned and cured for 24 hours. For each of the Comparative Examples, the BOPP Film is laminated to the five layer multilayer film using ADCOTE™ 545S/Co-reactant F applied at a coating weight of 3-3.5 gsm. Examples are cured at room temperature (25° C.) for two days and a hot roll lamination process is performed on ChemInstruments #007416 at a temperature of 75° C., pressure of 60 psi, and speed of 1.66 m/min.

The five layer multilayer co-extruded films for each of the Inventive and Comparative Examples is formed on a Collin 5-layer blown co-extrusion line with the following parameters—target film thickness: 55 μm; extruders: 4 extruders; layer configurations: A/B/C/B/D; layer ratio (%): 18.2 %/13.6%/18.2%/13.6 %/36.4% (or 2/1.5/2/1.5/4); layer thickness (μm): 10/7.5/10/7.5/20; die diameter (mm): 50; blow up ratio (BUR): 3.0; layflat width: 235 mm; total throughput of 8 kg/hr; line speed of 5.4 mlmin; melt temperature (° C.) of extruders A, B, C, and D of 163-174° C., 191° C., 195° C., and 175-185° C., respectively.

Table 1 below provides the structure and composition of the laminate examples, Inventive Examples 1-5 and Comparative Examples 1-2.

adhesives in the laminate. Although the Comparative Examples in aspects show lower OTR and WVTR values, the Comparative Examples are not compatible with polyethylene recycling streams. Also, a person of ordinary skill in the art will appreciate that the OTR of the laminate can be adjusted depending on the thickness and ethylene content of the EVOH of the barrier layer (i.e., in general, the thicker the barrier layer or the lower the ethylene content, the lower the achievable OTR value is). As noted above, the Inventive Examples are nonlimiting examples, not intended to limit the scope of the disclosure, and a multilayer film according to embodiments of the present invention can include a barrier layer comprising an EVOH having an ethylene content of from 20 to 50 mol %.

TABLE 2

| Thickness Bond Strength, OTR, and WVTR | | | | |
|---|---|---|---|---|
| Example | Thickness (μm) | Bond Strength (N/25 mm) | OTR (cm³/ day/m²) | WVTR (g/day/m²) |
| Comp. 1 | 73 | 1.72 (to printing ink)* | 2.68 | 2.85 |
| Comp. 2 | 73 | 1.41 (to printing ink)* | 1.82 | 2.49 |
| Inv. 1 | 75 | 7.79 | 5.15 | 5.25 |
| Inv. 2 | 75 | 5.85 | 2.88 | 5.06 |
| Inv. 3 | 75 | 7.47 | 3.56 | 4.60 |
| Inv. 4 | 75 | 7.00 | 2.28 | 5.72 |
| Inv. 5 | 75 | 6.76 | 2.56 | 5.15 |

*The BOPP Film for Comparative Examples is a printed BOPP with the printed ink side laminated to the five-layer film using solvent-based laminating adhesive and so bond strength is measured according to the printed ink side of the BOPP to the five-layer film.

TABLE 1

| Laminate Structure and Composition | | | | | | |
|---|---|---|---|---|---|---|
| Example | Print | Layer A | Layer B | Layer C | Layer B | Layer D |
| Comp. 1 | BOPP | DOW ™ LDPE 450E | 50% BYNEL ™ 41E710 + 50% ELITE ™ 5960G1 | EVAL ™ H171B | 50% BYNEL ™ 41E710 + 50% ELITE ™ 5960G1 | 80% AFFINITY ™ PF 7266* |
| Comp. 2 | BOPP | DOW ™ LDPE 450E | 50% BYNEL ™ 41E710 + 50% ELITE ™ 5960G1 | EVAL ™ H171B | 50% BYNEL ™ 41E710 + 50% ELITE ™ 5960G1 | 93.5% SURLYN ™ 1707** |
| Inv. 1 | TF-BOPE | 96% BYNEL ™ 22E780 + 4% Conpol ® 13B | 50% BYNEL ™ 41E710 + 50% ELITE ™ 5960G1 | EVAL ™ H171B | 50% BYNEL ™ 41E710 + 50% ELITE ™ 5960G1 | 80% AFFINITY ™ PF 7266* |
| Inv. 2 | TF-BOPE | 90% ELVAX ™ 470 + 10% Polybatch ® AB5 | 50% BYNEL ™ 41E710 + 50% ELITE ™ 5960G1 | EVAL ™ H171B | 50% BYNEL ™ 41E710 + 50% ELITE ™ 5960G1 | 80% AFFINITY ™ PF 7266* |
| Inv. 3 | TF-BOPE | 90% AFFINITY ™ PF 7266 + 10% Polybatch ® AB5 | 50% BYNEL ™ 41E710 + 50% ELITE ™ 5960G1 | EVAL ™ H171B | 50% BYNEL ™ 41E710 + 50% ELITE ™ 5960G1 | 80% AFFINITY ™ PF 7266* |
| Inv. 4 | TF-BOPE | 96% BYNEL ™ 22E780 + 4% Conpol ® 13B | 50% BYNEL ™ 41E710 + 50% ELITE ™ 5960G1 | EVAL ™ H171B | 50% BYNEL ™ 41E710 + 50% ELITE ™ 5960G1 | 93.5% SURLYN ™ 1707** |
| Inv. 5 | TF-BOPE | 90% ELVAX ™ 470 + 10% Polybatch ® AB5 | 50% BYNEL ™ 41E710 + 50% ELITE ™ 5960G1 | EVAL ™ H171B | 50% BYNEL ™ 41E710 + 50% ELITE ™ 5960G1 | 93.5% SURLYN ™ 1707** |

*In addition to 80% AFFINITY ™ PF 7266, Layer D includes 10% POLYBATCH ® CE505 and 10% POLYBATCH ® AB5.
**In addition to 93.5% SURLYN ™ 1707, Layer D includes 4% CONPOL ™ 13B and 2.5% CONPOL ™ 20S1.

Figure 2:
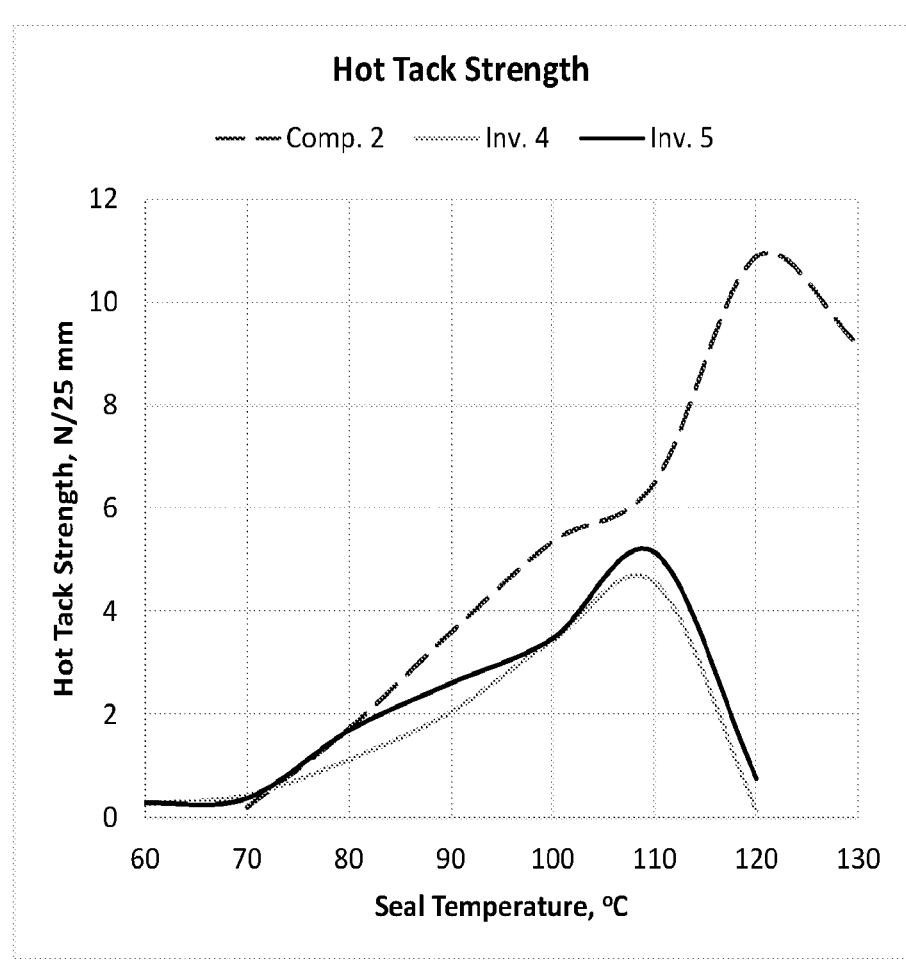
FIG. 2 is a hot tack strength graph of Comparative and Inventive Examples discussed below.

The thickness, oxygen transmission rate (OTR), water vapor transmission rate (WVTR), and bond strength of the examples are measured. Table 2 provides the results. As shown in Table 2, the bond strength of the Inventive Examples is surprisingly high, as compared to the bond strength of the Comparative Examples. The Inventive Examples do not have delamination between the multilayer film and the oriented film despite the absence of laminating The heat seal initiation temperature (HSIT), heat seal strength, hot tack initiation temperature at 1 Newton, and hot tack strength are measured. FIG. 1 shows the heat seal strength curves of Comparative Example 1 and Inventive Examples 1-3. FIG. 2 shows the hot tack strength curves of Comparative Example 2 and Inventive Examples 4-5. Table 3 provides results for Comparative Example 1 and Inventive Examples 1-3, where AFFINITY™ PF 7266 is part of the sealant layer/Layer D. From the data of Table 3, the Inventive Examples have lower HSIT and in aspect higher seal strength. Table 4 provides results for Comparative Example 2 and Inventive Examples 4-5, where SURLYN™ 1707 is part of the sealant layer/Layer D. From the data of Table 4, the Inventive Examples show higher or desirable hot tack strength. From Tables 3 and 4, the Inventive Examples show a desirable or maintained low hot tack initiation temperature and low HSIT. The Inventive Examples also achieve in aspects desirable, maintained, or improved seal strength performance.

TABLE 3

HSIT, Seal Strength, Hot Tack Initiation, and Hot Tack Strength for Comparative Example 1 and Inventive Examples 1-3.

| Example | HSIT @ 5N (° C.) | Seal Strength @ 120° C. (N/25 mm) | Hot Tack Initiation @ 1N (° C.) | Hot Tack Strength @ 110° C. (N/25 mm) |
|---|---|---|---|---|
| Comp. 1 | 74 | 47.9 | 78 | 1.51 |
| Inv. 1 | 71 | 34.8 | 70 | 1.31 |
| Inv. 2 | 72 | 52.5 | 75 | 1.85 |
| Inv. 3 | 73 | 58.7 | 75 | 1.85 |

TABLE 4

HSIT, Seal Strength, Hot Tack Initiation, and Hot Tack Strength for Comparative Example 2 and Inventive Examples 4-5.

| Example | HSIT @ 5N (° C.) | Seal Strength @ 120° C. (N/25 mm) | Hot Tack Initiation @ 1N (° C.) | Hot Tack Strength @ 110° C. (N/25 mm) |
|---|---|---|---|---|
| Comp. 2 | 97 | 12.2 | 75 | 6.43 |
| Inv. 4 | 106 | 4.9 | 76 | 4.56 |
| Inv. 5 | 101 | 11.2 | 75 | 5.15 |

The shrinkage (%) at 70° C., 80° C., 90° C., 100° C., 110° C., and 120° C. of the examples is measured. None of the examples show shrinkage at 70° C., 80° C., 90° C., 100° C., or 110° C. in the machine direction (MD) or cross or transverse direction (TD). The results of shrinkage (%) for the examples are reported in Table 5. Although the Inventive Examples show some shrinkage at 120° C. as compared to Comparative Examples, the Inventive Examples can perform equivalent or similar to the Comparative Examples in lower temperature ranges of approximately 70° C.–110° C., which offers a broad sealing window of at least 40° C.

TABLE 5

Shrinkage (%) between 70 and 120° C. within the heat sealing window

| Example | Shrinkage (%) in MD @ 70-110° C.* | Shrinkage (%) in TD @ 70-110° C.* | Shrinkage (%) in MD @ 120° C.* | Shrinkage (%) in TD @ 120° C.* |
|---|---|---|---|---|
| Comp. 1 | 0 | 0 | 0 | 0 |
| Comp. 2 | 0 | 0 | 0 | 0 |
| Inv. 1 | 0 | 0 | >8 | 8 |
| Inv. 2 | 0 | 0 | >8 | 8 |
| Inv. 3 | 0 | 0 | >8 | 4 |
| Inv. 4 | 0 | 0 | >8 | 4 |
| Inv. 5 | 0 | 0 | >8 | 4 |

*Seal bar dimensions: 0.5 cm (MD direction) × 2.5 cm (TD direction).

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A laminate comprising:

(a) a multilayer film comprising:

(1) an outer layer comprising at least one of an anhydride-modified ethylene acrylate copolymer, anhydride-modified polyethylene, anhydride-modified ethylene vinyl acetate, ethylene-vinyl acetate copolymer, polyethylene/vinyl acetate copolymer, polyethylene/acrylic acid ethylene copolymer, polyethylene/acrylate copolymer, or polyethylene elastomer/plastomer;

(2) a barrier layer comprising an ethylene vinyl alcohol copolymer;

(3) a sealant layer, wherein the sealant layer comprises at least 70 wt. % of a polymer having a highest peak melting temperature ($T_m$) of 108° C. or less; and (4) a tie layer between the barrier layer and the sealant layer; and (b) an oriented film comprising an ethylene-based polymer having a density from 0.900 to 0.970 g/cm³; wherein the tie layer comprises an anhydride-modified, linear low density polyethylene and at least one of a linear low density polyethylene, low density polyethylene, medium density polyethylene, or high density polyethylene; wherein the laminate is formed by a process consisting of coextruding the multilayer film, extruding the oriented film, orienting the oriented film, and thermally laminating the outer layer of the multilayer film to the oriented film.

2. The laminate of claim 1, wherein the multilayer film further comprises a second tie layer between the outer layer and the barrier layer.

3. The laminate of claim 1, wherein the barrier layer is 5 to 25% of overall thickness of the multilayer film.

4. The laminate of claim 1, wherein the sealant layer is at least 10 microns thick.

5. The laminate of claim 1, wherein the sealant layer is 25 to 60% of overall thickness of the multilayer film.

6. The laminate of claim 1, wherein the oriented film is a machine direction oriented film.

7. The laminate of claim 1, wherein the oriented film is a biaxially oriented film.

8. The laminate of claim 1, wherein the sealant layer comprises a polyethylene elastomer/plastomer.

9. The laminate of claim 1, wherein the sealant layer comprises an ionomer of ethylene acid copolymer.

10. The laminate of claim 1, wherein the outer layer further comprises at least one of a linear low density polyethylene, low density polyethylene, medium density polyethylene, or high density polyethylene.

* * * * *